(12) United States Patent
Min

(10) Patent No.: US 11,565,657 B2
(45) Date of Patent: *Jan. 31, 2023

(54) INFRARED BIOMETRICS INFORMATION COLLECTION DEVICE AND DOOR LOCKS HAVING THE SAME

(71) Applicant: NANJING EASTHOUSE ELECTRICAL CO., LTD., Nanjing (CN)

(72) Inventor: Hao Min, Nanjing (CN)

(73) Assignee: NANJING EASTHOUSE ELECTRICAL CO., LTD., Nanjing (CN)

(*) Notice: Subject to any disclaimer, the term of this patent is extended or adjusted under 35 U.S.C. 154(b) by 157 days.

This patent is subject to a terminal disclaimer.

(21) Appl. No.: 17/242,299

(22) Filed: Apr. 28, 2021

(65) Prior Publication Data
US 2021/0245710 A1 Aug. 12, 2021

Related U.S. Application Data

(63) Continuation of application No. 16/069,482, filed on Jul. 11, 2018, now Pat. No. 11,034,331.

(30) Foreign Application Priority Data

Jul. 3, 2018 (WO) .................. PCT/CN2018/094268

(51) Int. Cl.
*B60R 25/25* (2013.01)
*B60R 25/01* (2013.01)
(Continued)

(52) U.S. Cl.
CPC .......... *B60R 25/252* (2013.01); *B60R 25/01* (2013.01); *B60R 25/31* (2013.01); *G06V 40/13* (2022.01);
(Continued)

(58) Field of Classification Search
CPC ....... B60R 25/252; B60R 25/01; B60R 25/31; B60R 2325/101; G06V 40/13;
(Continued)

(56) References Cited

U.S. PATENT DOCUMENTS 8,805,028 B2 * 8/2014 Miura ................ E05B 81/76
340/5.52
9,690,970 B2 * 6/2017 Wang ................. G06V 40/18
(Continued)

FOREIGN PATENT DOCUMENTS

CN 102378983 A * 3/2012 ......... G06K 9/00033
CN 105980853 A * 9/2016 ........... A61B 5/0059
(Continued)

*Primary Examiner* — Mahendra R Patel
(74) *Attorney, Agent, or Firm* — Ming Jiang; MM IP Services LLC

(57) ABSTRACT

The present disclosure relates to a door lock having an infrared biometrics information collection device. In certain embodiments, the door lock includes, a door with a door handle for opening the door, an infrared light source, and an infrared biometrics information collection sensor. The infrared light source includes one or more infrared light emitters. The infrared biometrics information collection sensor captures at least one infrared image of biometrics information of the one or more fingers of a target human hand. The fingers are positioned between the infrared light source and the infrared biometrics information collection sensor. The infrared light source irradiates infrared light through one or more fingers to generate infrared images of biometrics information of fingers to be captured by infrared biometrics information collection sensor, infrared images of biometrics information captured are used for user authentications, and the door lock can be unlocked by an authenticated user.

20 Claims, 3 Drawing Sheets

(51) Int. Cl.
*B60R 25/31* (2013.01)
*G06V 40/13* (2022.01)
*G06V 40/12* (2022.01)

(52) U.S. Cl.
CPC .... *B60R 2325/101* (2013.01); *G06V 40/1341* (2022.01)

(58) Field of Classification Search
CPC .. G06V 40/1341; G06V 10/147; G06V 40/10; G06V 40/117; G06V 40/1324; G07C 2209/64; G07C 9/00563; G07C 9/00896
USPC .......................................................... 382/124
See application file for complete search history.

(56) References Cited

U.S. PATENT DOCUMENTS

| | | | | |
|---|---|---|---|---|
| 9,946,906 | B2 * | 4/2018 | Ricci | G06Q 20/401 |
| 10,318,832 | B2 * | 6/2019 | Shin | G06F 21/32 |
| 10,325,142 | B2 * | 6/2019 | He | G06V 40/1306 |
| 10,354,120 | B2 * | 7/2019 | Kim | G06V 40/70 |
| 10,719,692 | B2 * | 7/2020 | Kalscheur | G06F 21/32 |
| 2008/0158096 | A1 * | 7/2008 | Breed | G01S 15/88 340/436 |
| 2009/0322477 | A1 * | 12/2009 | Celorio | G07C 9/257 340/5.82 |
| 2014/0162598 | A1 * | 6/2014 | Villa-Real | H04M 1/66 455/411 |
| 2016/0256079 | A1 * | 9/2016 | Shimano | A61B 5/6826 |
| 2017/0116455 | A1 * | 4/2017 | Alameh | G06V 40/13 |
| 2018/0218196 | A1 * | 8/2018 | Chhabra | G06V 10/22 |
| 2019/0340344 | A1 * | 11/2019 | Choi | G06K 9/00 |
| 2021/0064843 | A1 * | 3/2021 | Ishibe | G06V 10/141 |

FOREIGN PATENT DOCUMENTS

| | | | | |
|---|---|---|---|---|
| JP | 2015015051 A | * | 1/2015 | ......... G06K 9/00013 |
| JP | 2017049867 A | * | 3/2017 | ......... G06K 9/00013 |
| JP | 2017097574 A | * | 6/2017 | ......... G06K 9/00013 |
| JP | 2018063604 A | * | 4/2018 | ........... A61B 5/0059 |
| WO | WO-0039744 A1 | * | 7/2000 | ......... G06K 9/00013 |
| WO | WO-2014033842 A1 | * | 3/2014 | ............. G06F 21/32 |
| WO | WO-2014204110 A1 | * | 12/2014 | ......... G06K 9/00013 |
| WO | WO-2015114872 A1 | * | 8/2015 | ........... A61B 5/0059 |
| WO | WO-2017082100 A1 | * | 5/2017 | ........... A61B 5/1171 |
| WO | WO-2017187718 A1 | * | 11/2017 | ........... A61B 5/1172 |

* cited by examiner

INFRARED BIOMETRICS INFORMATION COLLECTION DEVICE AND DOOR LOCKS HAVING THE SAME

FIELD

The present disclosure generally relates to user authentication, and more particularly to infrared biometrics information collection devices, and door locks having the infrared biometrics information collection devices.

BACKGROUND

Infrared biometrics information collection devices can be used for user authentication with high accuracy, and this technology has been widely used in many security areas except automobile industry. Conventional infrared biometrics information collection devices are mostly used in-door such that the infrared biometrics information collection devices are not interfered with broad light spectrum, and the infrared biometrics information collection devices are operated in suitable room temperature instead of extremely high or low temperature. The application of this technology to entry door industry presents us a challenge that the infrared biometrics information collection devices must be used outdoor, and must be able to overcome the light interference and extreme temperature.

Therefore, heretofore unaddressed needs still exist in the art to address the aforementioned deficiencies and inadequacies.

SUMMARY

In one aspect, the present disclosure relates to an infrared biometrics information collection device. In certain embodiments, the infrared biometrics information collection device includes: an infrared light source, an infrared biometrics information collection sensor, and a lock controller. The infrared light source includes one or more infrared light emitters and a defrost module. The defrost module is mounted on an outer surface of the infrared light emitters. The infrared biometrics information collection sensor also includes a defrost module mounted on an outer surface of the infrared biometrics information collection sensor for capturing at least one infrared image of biometrics information of one or more fingers of a target human hand. The defrost modules are used for defrosting the surface of the infrared light source, and the surface of the infrared biometrics information collection sensor.

In certain embodiments, the lock controller includes: a power module, a processor and a non-volatile memory. The power module provides electric power to the infrared light source, the infrared biometrics information collection sensor, and the lock controller. The non-volatile memory stores computer executable instructions. When executed by the processor, the computer executable instructions cause the processor to:

turn on the infrared biometrics information collection device, when a human is detected by a proximity sensor;

irradiate, by the infrared light source, infrared light through the one or more fingers to form the infrared image of biometrics information of the one or more fingers, when the infrared biometrics information collection sensor, when the one or more fingers are positioned in a biometrics information collection space between the infrared light source and the infrared biometrics information collection sensor; and capture, by the infrared biometrics information collection sensor, the infrared image of biometrics information of the one or more fingers formed on the infrared biometrics information collection sensor; and comparing, by an image processing module, the infrared image of biometrics information of the one or more fingers captured to a plurality of infrared images of biometrics information stored in a biometrics storage module for user authentication.

In certain embodiments, the biometrics information of the one or more fingers includes finger veins, finger bone structure, and finger tissue patterns.

In certain embodiments, the infrared biometrics information collection device includes an infrared light transmission space formed by infrared light transparent media. The infrared light transmission space includes a first infrared light transmission space, the biometrics information collection space, and a second infrared light transmission space. The one or more fingers are placed in the biometrics information collection space.

In certain embodiments, the infrared biometrics information collection device includes one or more infrared band-pass filters positioned between the infrared light source and the infrared biometrics information collection sensor to reduce the light interference from outside of infrared light spectrum and improve image quality of the infrared image of biometrics information of the one or more fingers.

In certain embodiments, when the human approaches the infrared biometrics information collection device within a predetermined distance from the infrared biometrics information collection device, the proximity sensor detects the human, and sends a command to the power module to turn on the infrared biometrics information collection device. The proximity sensor includes a motion sensor, a blue-tooth proximity sensor, and a Narrowband Internet of Thing (NB-IoT) proximity sensor.

In another aspect, the present disclosure relates to a door lock having an infrared biometrics information collection device. In certain embodiments, the door lock includes: a door handle, an infrared light source, an infrared biometrics information collection sensor, and a lock controller. The door handle is installed on a door for a user to lock and unlock the door. The infrared light source includes one or more infrared light emitters and a defrost module. The infrared biometrics information collection sensor also includes a defrost module. The infrared biometrics information collection sensor captures at least one infrared image of biometrics information of one or more fingers of a target human hand. The defrost modules are used for defrosting the surface of the infrared light source, and the surface of the infrared biometrics information collection sensor.

In certain embodiments, the lock controller includes: a power module, a processor and a non-volatile memory. The power module provides electric power to the infrared light source, the infrared biometrics information collection sensor, and the lock controller. The non-volatile memory stores computer executable instructions. When executed by the processor, the computer executable instructions cause the processor to:

turn on infrared biometrics information collection device, when human is detected by a proximity sensor;

irradiate, by the infrared light source, infrared light through the one or more fingers to form at least one infrared image of biometrics information of the one or more fingers on the infrared biometrics information collection sensor;

capture, by the infrared biometrics information collection sensor, the infrared image of biometrics information of the one or more fingers formed on the infrared biometrics information collection sensor;

compare, by an image processing module, the infrared image of biometrics information of the one or more fingers captured to a plurality of infrared images of biometrics information stored in a biometrics storage module; and unlock, by a lock control module, the door lock when at least one of the infrared images of biometrics information stored in the biometrics storage module matches the infrared image of biometrics information of the one or more fingers captured.

In certain embodiments, the biometrics information of the one or more fingers includes: finger veins, finger bone structure, and finger tissue patterns.

In one embodiment, the infrared light source is positioned on the door handle, and the infrared biometrics information collection sensor is positioned on the door. In another embodiment, the infrared light source is positioned on the door, and the infrared biometrics information collection sensor is positioned on the door handle.

In certain embodiments, the defrost module of the infrared light source is positioned on an outer surface of the infrared light source, and the defrost module of the infrared biometrics information collection sensor is positioned on an outer surface of the infrared biometrics information collection sensor.

In certain embodiments, the infrared biometrics information collection device includes an infrared light transmission space formed by infrared light transparent media. The infrared light transmission space includes a first infrared light transmission space, the biometrics information collection space, and a second infrared light transmission space. The one or more fingers are placed in the biometrics information collection space. The infrared light transmission space includes one or more finger placement notches for placing the one or more fingers, and the one or more finger placement notches are placed inside of the door handle.

In certain embodiments, the infrared biometrics information collection device includes one or more infrared bandpass filters positioned between the infrared light source and the infrared biometrics information collection sensor to reduce the light interference from outside of infrared light spectrum and improve image quality of the infrared image of biometrics information of the one or more fingers.

In certain embodiments, when the human approaches the infrared biometrics information collection device within a predetermined distance from the infrared biometrics information collection device, the proximity sensor detects the human, and sends a command to the power module to turn on the infrared biometrics information collection device. The proximity sensor includes a motion sensor, a blue-tooth proximity sensor, and a Narrowband Internet of Thing (NB-IoT) proximity sensor.

In certain embodiments, the door lock may include a door handle control mechanism. The door handle is enclosed in the door when the door is locked, and is opened by the human with a touch on the door handle control mechanism, or by the proximity sensor when the proximity sensor detects the human within the predetermined distance from the door lock.

These and other aspects of the present disclosure will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the present disclosure, and features and benefits thereof, and together with the written description, serve to explain the principles of the present invention. Wherever possible, the same reference numbers are used throughout the drawings to refer to the same or like elements of an embodiment, and wherein.

DETAILED DESCRIPTION

Figure 1:
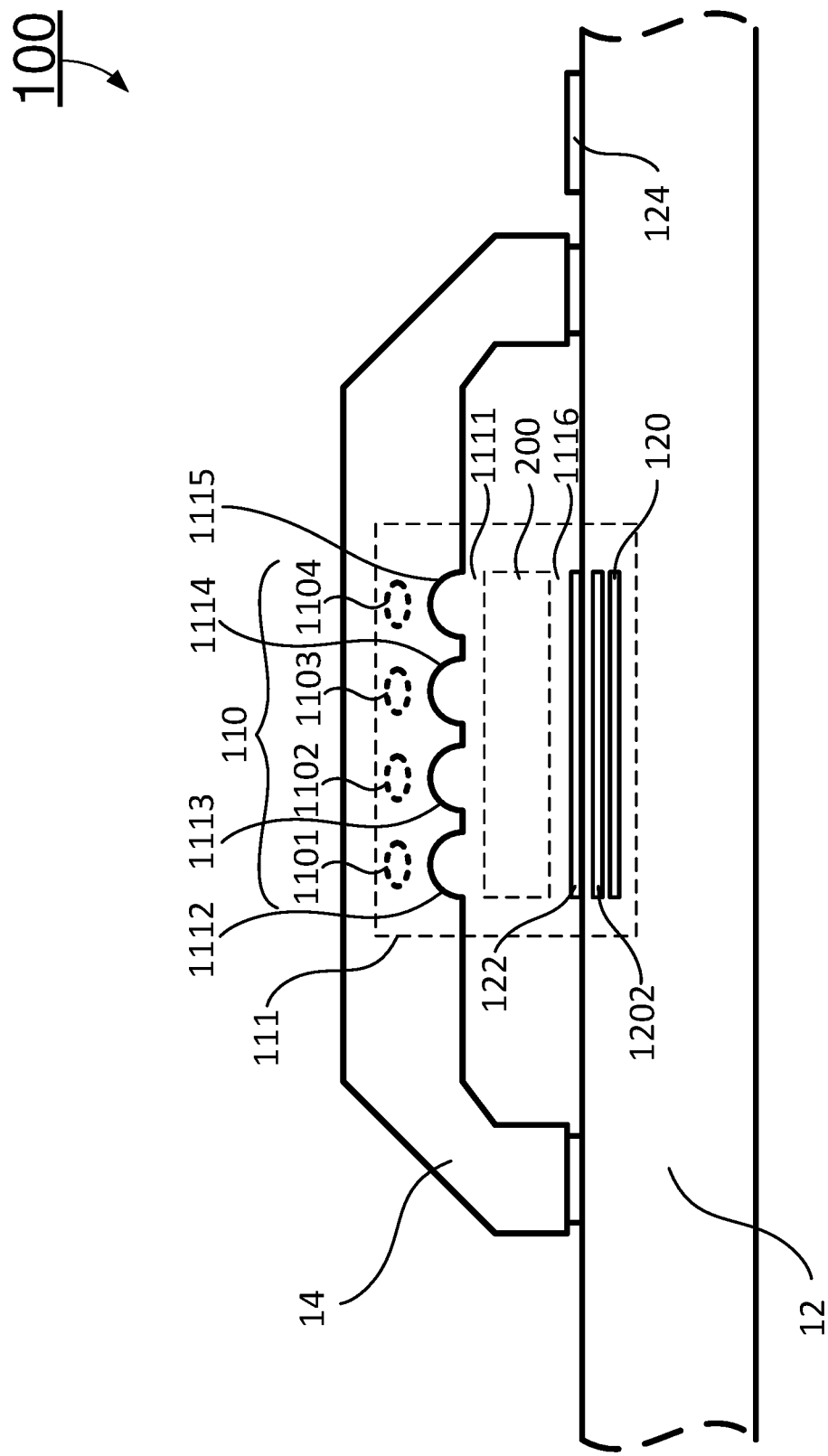
FIG. 1 shows a door lock having an infrared biometrics information collection device according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code" and "application", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or conventionally) without altering the principles of the present disclosure.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Figure 2:
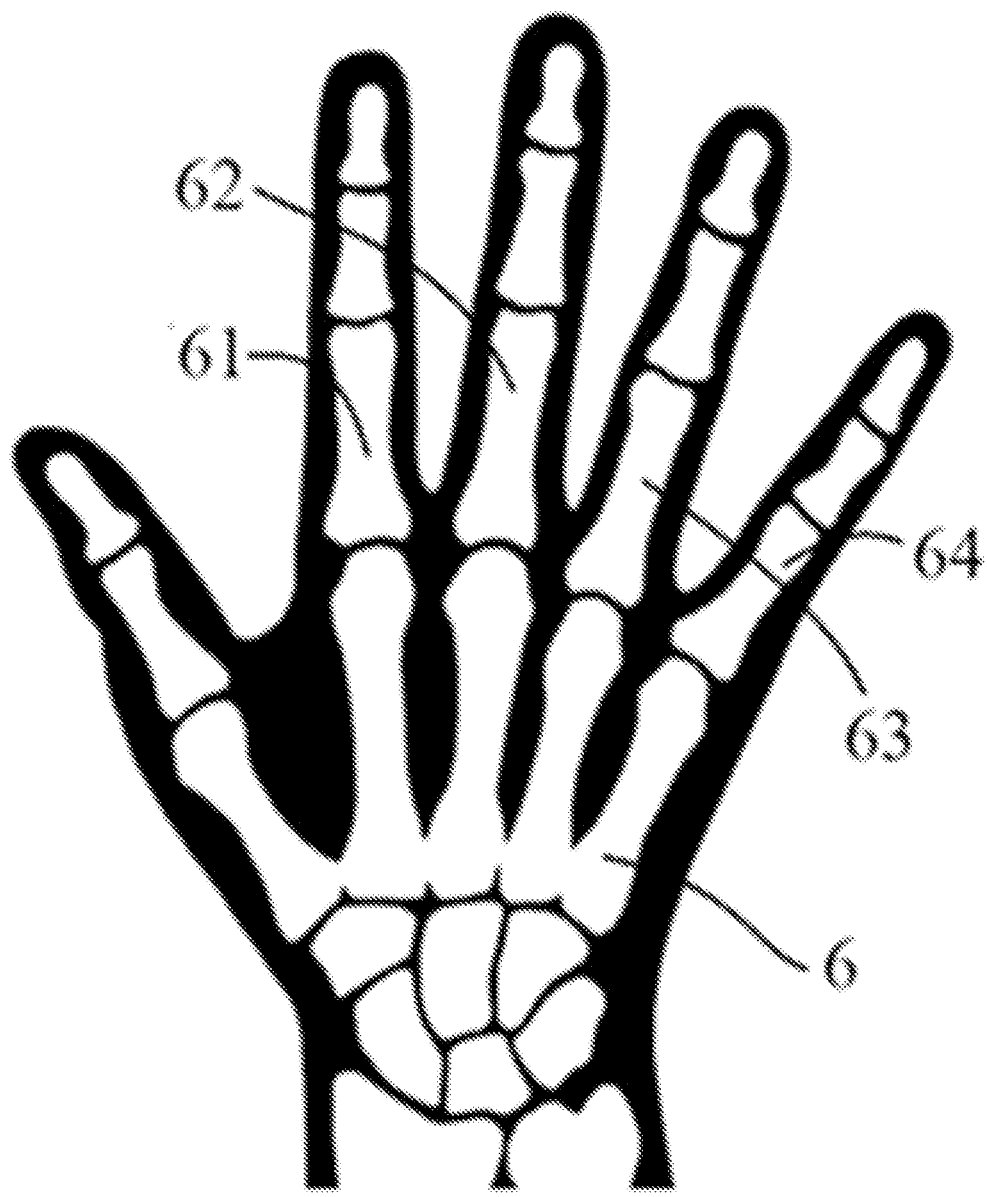
FIG. 2 shows finger structures of a target human hand.
Figure 3:
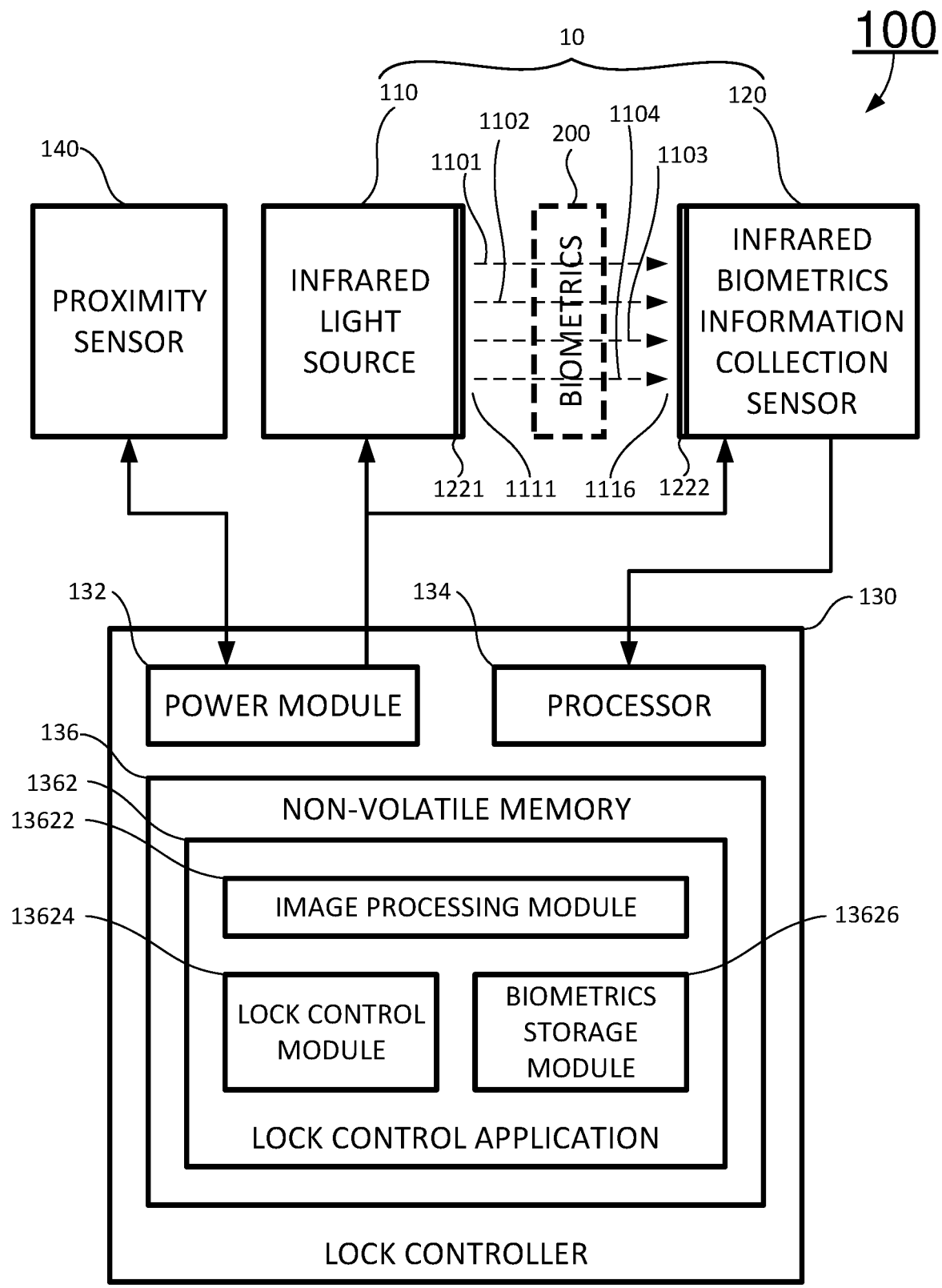
FIG. 3 shows a block diagram of a door lock having the infrared biometrics information collection device according to certain embodiments of the present disclosure.

Referring now to FIGS. 1-3, in one aspect, the present disclosure relates to an infrared biometrics information collection device 10. In certain embodiments, the infrared biometrics information collection device 10 includes an infrared light source 110, and an infrared biometrics information collection sensor 120. The infrared light source 110 includes one or more infrared light emitters. In one embodiment, as shown in FIG. 1, the infrared biometrics information collection device 10 has a first infrared light emitter 1101, a second infrared light emitter 1102, a third infrared light emitter 1103, and a fourth infrared light emitter 1104 for four fingers 61-64 of a target human hand 6, as shown in FIG. 2. In another embodiment, the infrared light source 110 may include only one infrared light emitter 1101 for irradiating infrared light for a thumb of the target human hand 6. Although the infrared biometrics information collection device 10 may have sufficient accuracy for user authentication when having biometrics information of one finger such as one thumb, but when biometrics information comes from the four fingers 61-64, the accuracy and reliability of user authentication may be further improved. The infrared biometrics information collection sensor 120 is positioned on an opposite side of the infrared light source 110, and captures at least one infrared image of biometrics information of the fingers 61-64 of the target human hand 6.

In certain embodiments, as shown in FIGS. 1 and 3, the infrared biometrics information collection device 10 includes an infrared light transmission space 111. The infrared light transmission space 111 is formed by infrared light transparent media. The infrared light transmission space 111 includes a first infrared light transmission space 1111, a biometrics information collection space 200, and a second infrared light transmission space 1116. The fingers 61-64 are placed in the biometrics information collection space 200.

In certain embodiments, the fingers 61-64 are positioned in the biometrics information collection space 200 between the first infrared light transmission space 1111 and the second infrared light transmission space 1116, as shown in FIG. 3. The infrared light source 110 irradiates infrared light beams 1101, 1102, 1103, and 1104 through the fingers 61-64 to generate the infrared image of biometrics information of the fingers 61-64 on the infrared biometrics information collection sensor 120. The infrared biometrics information collection sensor 120 captures the infrared image of biometrics information of the fingers 61-64.

In one embodiment, the biometrics information of the fingers 61-64 includes finger veins patterns. In another embodiment, the biometrics information of the fingers 61-64 includes finger bone structure patterns. In yet another embodiment, the biometrics information of the fingers 61-64 includes finger tissue patterns. Many other biometrics information of the fingers 61-64 may be used for user authentications in the infrared biometrics information collection device 10.

In certain embodiments, the infrared biometrics information collection device 10 includes one or more infrared bandpass filters 1202 positioned between the infrared light source 110 and the infrared biometrics information collection sensor 120 to reduce light interference from outside of infrared light spectrum and improve image quality of the infrared image of biometrics information of the fingers 61-64. In one embodiment, as shown in FIG. 1, the infrared biometrics information collection device 10 has a first infrared bandpass filter 1202 attached to the surface of the infrared biometrics information collection sensor 120. In another embodiment, the infrared biometrics information collection device 10 may attach a second infrared bandpass filter (not shown in FIG. 1) to the surface of the infrared light source 110.

In certain embodiments, in order to allow the infrared biometrics information collection device 10 to operate in extreme cold weather, the infrared biometrics information collection device 10 includes one or more defrost modules 122. As shown in FIG. 3, in one embodiment, the infrared biometrics information collection device 10 includes a first defrost module 1221 attached to the surface of the infrared light source 110 for defrosting the surface of the infrared light source 110. In another embodiment, the infrared biometrics information collection device 10 includes a second defrost module 1222 attached to the surface of the infrared biometrics information collection sensor 120 for defrosting the surface of the infrared biometrics information collection sensor 120.

In certain embodiments, the infrared biometrics information collection device 10 may include a temperature sensor (not shown in FIGS. 1-3). When environment temperature reaches a pre-determined low temperature, the infrared biometrics information collection device 10 turns of the one or more defrost modules to defrost the surface of the infrared light source and the surface of the infrared biometrics information collection sensor.

In certain embodiments, as shown in FIG. 3, the infrared biometrics information collection device 10 includes a lock controller 130. The lock controller 130 includes: a power module 132, a processor 134 and a non-volatile memory 136. The power module 132 provides electric power to the infrared light source 110, the infrared biometrics information collection sensor 120, and the lock controller 130. The non-volatile memory 136 stores computer executable instructions. When executed by the processor 134, the computer executable instructions cause the processor 134 to: turn on infrared biometrics information collection device 10, when human is detected by a proximity sensor 140, irradiate, by the infrared light source 110, infrared light through the fingers 61-64 to form at least one infrared image of biometrics information of the fingers 61-64 on the infrared biometrics information collection sensor 120, and capture, by the infrared biometrics information collection sensor 120, the infrared image of biometrics information of the fingers 61-64 formed on the infrared biometrics information collection sensor 120.

In certain embodiments, the infrared biometrics information collection device 10 includes the proximity sensor 140. When the human approaches the infrared biometrics information collection device 10 within a predetermined distance from the infrared biometrics information collection device 10, the proximity sensor 140 detects the human, and sends a command to the power module 132 to turn on the infrared biometrics information collection device 10. In one embodiment, the proximity sensor 140 includes a motion sensor. In another embodiment, the proximity sensor 140 includes a blue-tooth proximity sensor. In yet another embodiment, the proximity sensor 140 includes a Narrowband Internet of Thing (NB-IoT) proximity sensor. Other proximity sensors may also be used in combination with the infrared biometrics information collection device 10.

In another aspect, the present disclosure relates to a door lock 100 having an infrared biometrics information collection device 10, as shown in FIGS. 1 and 3. In certain embodiments, the door lock 100 includes, a door 12 with a door handle 14 for opening the door 12, an infrared light source 110, an infrared biometrics information collection sensor 120, and a lock controller 130.

In certain embodiments, the infrared light source 110 includes one or more infrared light emitters. In one embodiment, as shown in FIG. 1, the infrared biometrics information collection device 10 has a first infrared light emitter 1101, a second infrared light emitter 1102, a third infrared light emitter 1103, and a fourth infrared light emitter 1104 for four fingers 61-64 of a target human hand 6, as shown in FIG. 2. In another embodiment, the infrared light source 110 may include only one infrared light emitter 1101 for irradiating infrared light for a thumb of the target human hand 6. Although the infrared biometrics information collection device 10 may have sufficient accuracy for user authentication when having biometrics information of one finger such as one thumb, but when biometrics information comes from the four fingers 61-64, the accuracy of user authentication may be further improved. The infrared biometrics information collection sensor 120 is positioned on an opposite side of the infrared light source 110, and captures at least one infrared image of biometrics information of the fingers 61-64 of the target human hand 6.

In certain embodiments, the lock control module 130 includes a power module 132 to provide electric power to the infrared light source 110, the infrared biometrics information collection sensor 120, and the lock controller 130, a processor 134 and a non-volatile memory 136 storing computer executable instructions.

In one embodiment, the infrared light source 110 is positioned on the door handle 14 as shown in FIG. 1, and the infrared biometrics information collection sensor 120 is positioned on the door 12. In another embodiment, the infrared light source 110 may be positioned on the door 12, and the infrared biometrics information collection sensor 120 may be positioned on the door handle 14 (not shown in FIG. 1).

In certain embodiments, as shown in FIGS. 1 and 3, the door lock 100 includes an infrared light transmission space 111. The infrared light transmission space 111 is formed by infrared light transparent media. The infrared light transmission space 111 includes a first infrared light transmission space 1111, a biometrics information collection space 200, and a second infrared light transmission space 1116. The fingers 61-64 are placed in the biometrics information collection space 200.

In certain embodiments, the infrared light transmission space 111 further includes one or more finger placement notches 1112, 1113, 1114, and 1115 for placing the fingers 61-64. The finger placement notches 1112, 1113, 1114, and 1115 are placed inside of the door handle 14.

In certain embodiments, the fingers 61-64 are positioned over the finger placement notches 1112, 1113, 1114, and 1115 located in the biometrics information collection space 200 between the infrared light source 110 and the infrared biometrics information collection sensor 120, as shown in FIG. 3. The infrared light source 110 irradiates the infrared light beams 1101, 1102, 1103, and 1104 through the fingers 61-64 to generate the infrared image of biometrics information of the fingers 61-64 on the infrared biometrics information collection sensor 120. The infrared biometrics information collection sensor 120 captures the infrared image of biometrics information of the fingers 61-64. When the infrared image of biometrics information of the fingers 61-64 captured matches one of the infrared images of biometrics information stored in a biometrics storage module 13626 of the lock control module 130, the lock control module 130 opens the door 12.

In one embodiment, the biometrics information of the fingers 61-64 includes finger veins patterns. In another embodiment, the biometrics information of the fingers 61-64 includes finger bone structure patterns. In yet another embodiment, the biometrics information of the fingers 61-64 includes finger tissue patterns. Many other biometrics information of the fingers 61-64 may be used for user authentications in the door lock 100.

In certain embodiments, the door lock 100 includes one or more infrared bandpass filters 1202 positioned between the infrared light source 110 and the infrared biometrics information collection sensor 120 to reduce light interference from outside of infrared light spectrum from outside of infrared light spectrum and improve image quality of the infrared image of biometrics information of the fingers 61-64. In one embodiment, as shown in FIG. 1, the door lock 100 has a first infrared bandpass filter 1202 attached to the surface of the infrared biometrics information collection sensor 120. In another embodiment, the door lock 100 may attach a second infrared bandpass filter (not shown in FIG. 1) to the surface of the infrared light source 110.

In certain embodiments, in order to allow the door lock 100 to operate in extreme cold weather, the door lock 100 includes one or more defrost modules 122. As shown in FIG. 3, in one embodiment, the door lock 100 includes a first defrost module 1221 attached to the surface of the infrared light source 110 for defrosting the surface of the infrared light source 110. In another embodiment, the door lock 100 includes a second defrost module 1222 attached to the surface of the infrared biometrics information collection sensor 120 for defrosting the surface of the infrared biometrics information collection sensor 120.

In certain embodiments, the door lock 100 may include a temperature sensor (not shown in FIGS. 1-3). When environment temperature reaches a pre-determined low temperature, the door lock 100 turns of the one or more defrost modules to defrost the surface of the infrared light source and the surface of the infrared biometrics information collection sensor.

In certain embodiments, as shown in FIG. 3, the power module 132 provides electric power to the infrared light source 110, the infrared biometrics information collection sensor 120, and the lock controller 130. The non-volatile memory 136 stores computer executable instructions. When executed by the processor 134, the computer executable instructions cause the processor 134 to: turn on infrared biometrics information collection device 10, when human is detected by a proximity sensor 140, irradiate, by the infrared light source 110, infrared light through the fingers 61-64 to form at least one infrared image of biometrics information of the fingers 61-64 on the infrared biometrics information collection sensor 120, capture, by the infrared biometrics information collection sensor 120, the infrared image of biometrics information of the fingers 61-64 formed on the infrared biometrics information collection sensor 120, compare, by an image processing module 13622, the infrared image of biometrics information of the fingers 61-64 captured to a set of infrared images of biometrics information stored in a biometrics storage module 13626, and unlock, by a lock control module 13624, the door lock 100 when at least one of the set of infrared images of biometrics information stored in the biometrics storage module 13626 matches the infrared image of biometrics information of the fingers 61-64 captured.

In certain embodiments, the door lock 100 includes the proximity sensor 140. When the human approaches the door lock 100 within a predetermined distance from the door lock 100, the proximity sensor 140 detects the human, and sends a command to the power module 132 to turn on the door lock 100. In one embodiment, the proximity sensor 140 includes a motion sensor. In another embodiment, the proximity sensor 140 includes a blue-tooth proximity sensor. In yet another embodiment, the proximity sensor 140 includes a Narrowband Internet of Thing (NB-IoT) proximity sensor. Other proximity sensors may also be used in combination with the door lock 100.

In certain embodiments, the door lock 100 may include a door handle control mechanism 124. The door handle 14 may be enclosed in the door 12 when the door 12 is locked. In one embodiment, the door handle 14 may be opened by the human with a touch on the door handle control mechanism 124. In another embodiment, the door handle 14 may be opened by the proximity sensor 140 when the proximity sensor 140 detects the human within the predetermined distance from the door lock 100.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. An infrared biometrics information collection device, comprising:
    an infrared light source having a plurality of infrared light emitters and a defrost module;
    an infrared biometrics information collection sensor having a defrost module for capturing at least one infrared image of biometrics information of one or more fingers of a target human hand, and
    a lock controller, wherein the lock controller comprises:
        a power module to provide electric power to the infrared light source, the infrared biometrics information collection sensor, and the lock controller;
        a processor and a non-volatile memory storing computer executable instructions, when executed by the processor, the computer executable instructions cause the processor to:
            turn on infrared biometrics information collection device, when a human is detected by a proximity sensor;
            irradiate, by the infrared light source, infrared light through the one or more fingers to form the infrared image of biometrics information of the one or more fingers on the infrared biometrics information collection sensor, when the one or more fingers are positioned in a biometrics information collection space between the infrared light source and the infrared biometrics information collection sensor; and
            capture, by the infrared biometrics information collection sensor, the infrared image of biometrics information of the one or more fingers formed on the infrared biometrics information collection sensor; and
            comparing, by an image processing module, the infrared image of biometrics information of the one or more fingers captured to a plurality of infrared images of biometrics information stored in a biometrics storage module for user authentication.

2. The infrared biometrics information collection device of claim 1, wherein the biometrics information of the one or more fingers comprises finger veins, finger bone structure, and finger tissue patterns.

3. The infrared biometrics information collection device of claim 1 further comprising an infrared light transmission space formed by infrared light transparent media, wherein the infrared light transmission space comprises a first infrared light transmission space, the biometrics information collection space, and a second infrared light transmission space, wherein the one or more fingers are placed in the biometrics information collection space.

4. The infrared biometrics information collection device of claim 3 further comprising one or more infrared handpass filters positioned between the infrared light source and the infrared biometrics information collection sensor to reduce the light interference from outside of infrared light spectrum and improve image quality of the infrared image of biometrics information of the one or more fingers.

5. The infrared biometrics information collection device of claim 3, wherein the defrost modules are used for defrosting the surface of the infrared light source, and the surface of the infrared biometrics information collection sensor.

6. The infrared biometrics information collection device of claim 5 further comprising the proximity sensor, wherein when the human approaches the infrared biometrics information collection device within a predetermined distance from the infrared biometrics information collection device, the proximity sensor detects the human, and sends a command to the power module to turn on the infrared biometrics information collection device.

7. The infrared biometrics information collection device of claim 1, wherein the proximity sensor comprises a motion sensor, a blue-tooth proximity sensor, and a Narrowband Internet of Thing (NB-IoT) proximity sensor.

8. The infrared biometrics information collection device of claim 1, wherein the defrost module of the infrared light source is positioned on an outer surface of the infrared light source, and the defrost module of the infrared biometrics information collection sensor is positioned on an outer surface of the infrared biometrics information collection sensor.

9. A door lock having an infrared biometrics information collection device, comprising:
- a door handle installed on a door for a user to lock and unlock the door;
- an infrared light source having a plurality of infrared light emitters and a defrost module;
- an infrared biometrics information collection sensor having a defrost module for capturing at least one infrared image of biometrics information of one or more fingers of a target human hand; and
- a lock controller, wherein the lock controller comprises:
  - a power module to provide electric power to the infrared light source, the infrared biometrics information collection sensor, and the lock controller;
  - a processor and a non-volatile memory storing computer executable instructions, when executed by the processor, the computer executable instructions cause the processor to:
  - turning on infrared biometrics information collection device, when human is detected by a proximity sensor;
  - irradiating, by the infrared light source, infrared light through the one or more fingers to form at least one infrared image of biometrics information of the one or more fingers on the infrared biometrics information collection sensor;
  - capturing, by the infrared biometrics information collection sensor, the infrared image of biometrics information of the one or more fingers formed on the infrared biometrics information collection sensor;
  - comparing, by an image processing module, the infrared image of biometrics information of the one or more fingers captured to a plurality of infrared images of biometrics information stored in a biometrics storage module; and
  - unlocking, by a lock control module, the door lock when at least one of the plurality of infrared images of biometrics information stored in the biometrics storage module matches the infrared image of biometrics information of the one or more fingers captured.

10. The door lock of claim 9, wherein the biometrics information of the one or more fingers comprises finger veins, finger bone structure, and finger tissue patterns.

11. The door lock of claim 9, wherein the infrared light source is positioned on the door handle, and the infrared biometrics information collection sensor is positioned on the door.

12. The door lock of claim 9, wherein the infrared light source is positioned on the door, and the infrared biometrics information collection sensor is positioned on the door handle.

13. The door lock of claim 9, wherein the defrost module of the infrared light source is positioned on an outer surface of the infrared light source, and the defrost module of the infrared biometrics information collection sensor is positioned on an outer surface of the infrared biometrics information collection sensor.

14. The door lock of claim 9 further comprising an infrared light transmission space made of infrared light transparent medium, wherein the infrared light transmission space comprises a first infrared light transmission space, a biometrics information collection space, and a second infrared light transmission space, wherein the one or more fingers are placed in the biometrics information collection space.

15. The door lock of claim 14, wherein the infrared light transmission space further comprises one or more finger placement notches for placing the one or more fingers, wherein the one or more finger placement notches are placed inside of the door handle.

16. The door lock of claim 9 further comprising one or more infrared bandpass filters positioned between the infrared light source and the infrared biometrics information collection sensor to reduce the light interference from outside of infrared light spectrum and improve image quality of the infrared image of biometrics information of the one or more fingers.

17. The door lock of claim 9, wherein the defrost modules are used for defrosting the surface of the infrared light source, and the surface of the infrared biometrics information collection sensor.

18. The door lock of claim 9 further comprising the proximity sensor, wherein when human approaches the infrared biometrics information collection device within a predetermined distance from the door lock, the proximity sensor detects the human, and sends a command to the power module to turn on the infrared biometrics information collection device.

19. The door lock of claim 9, wherein the proximity sensor comprises a motion sensor, a blue-tooth proximity sensor, and a Narrowband Internet of Thing (NB-IoT) proximity sensor.

20. The door lock of claim 9 further comprising a door handle control mechanism, wherein the door handle is enclosed in the door when the door is locked, and is opened by the human with a touch on the door handle control mechanism, or by the proximity sensor when the proximity sensor detects the human within the predetermined distance from the door lock.

* * * * *